US010131320B2

(12) United States Patent
Schmotzer et al.

(10) Patent No.: US 10,131,320 B2
(45) Date of Patent: Nov. 20, 2018

(54) VEHICLE WHEEL ANTI-THEFT SYSTEM AND METHOD

(71) Applicant: Ford Global Technologies, LLC, Dearborn, MI (US)

(72) Inventors: John William Schmotzer, Canton, MI (US); Harminder Sandhu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 32 days.

(21) Appl. No.: 15/277,911

(22) Filed: Sep. 27, 2016

(65) Prior Publication Data

US 2018/0086306 A1 Mar. 29, 2018

(51) Int. Cl.
*B60R 25/10* (2013.01)
*B60R 25/102* (2013.01)

(52) U.S. Cl.
CPC ........ *B60R 25/102* (2013.01); *B60R 25/1001* (2013.01); *B60R 2325/103* (2013.01)

(58) Field of Classification Search
CPC ..... B60R 25/33; H04W 4/046; H04B 1/3816; H04L 67/12
See application file for complete search history.

(56) References Cited

U.S. PATENT DOCUMENTS 7,030,740 B2   4/2006   Huang
7,202,777 B2 * 4/2007   Tsuji .................. B60C 23/0413
                                                    116/34 A
9,084,076 B2   7/2015   Breed et al.
2003/0048178 A1 * 3/2003 Bonardi ............. B60C 23/0416
                                                    340/442

(Continued)

FOREIGN PATENT DOCUMENTS

CN   105751830 A   7/1916
CN   203438757 U   2/2014

(Continued)

OTHER PUBLICATIONS http://www.wirelessthings.be/en/services.php. "What Can LoRaWAN Do for Your?" Wireless Things.

(Continued)

*Primary Examiner* — Nader Bolourchi
(74) *Attorney, Agent, or Firm* — James P. Muraff; Neal, Gerber & Eisenberg LLP (57) ABSTRACT

Embodiments include a vehicle comprising a plurality of wheels, each wheel including a pressure sensor and a wireless transceiver; a central transceiver configured to obtain tire pressure and signal strength information from each of the wireless transceivers; and a processor communicatively coupled to the central transceiver and configured to detect removal of one of the wheels based on the signal strength information obtained from the wireless transceiver included in the removed wheel. Other embodiments include a method comprising obtaining tire pressure and signal strength information from each of a plurality of wireless transceivers respectively coupled to a plurality of wheels included in a vehicle; and detecting, using one or more processors, removal of one of the wheels from the vehicle based on the signal strength information obtained from the wireless transceiver included in the removed wheel.

20 Claims, 4 Drawing Sheets

(56) References Cited

U.S. PATENT DOCUMENTS

| | | |
|---|---|---|
| 2005/0093683 A1 | 5/2005 | Wee et al. |
| 2005/0093686 A1* | 5/2005 | LeMense ............ B60C 23/0408 340/442 |
| 2008/0048847 A1* | 2/2008 | Shimomura ........ B60C 23/0408 340/426.33 |
| 2012/0001745 A1 | 1/2012 | Li |
| 2012/0126967 A1* | 5/2012 | McCormick ........ B60C 23/0408 340/445 |
| 2016/0075306 A1* | 3/2016 | Utter .................. B60R 25/1001 340/426.31 |
| 2017/0057461 A1* | 3/2017 | Gaskin ................ B60R 25/1001 |
| 2017/0197583 A1* | 7/2017 | Izraeli .................. B60R 25/102 |

FOREIGN PATENT DOCUMENTS

| | | |
|---|---|---|
| CN | 103693007 A | 4/2014 |
| CN | 103847688 A | 6/2014 |
| EP | 1043179 A2 | 10/2000 |
| GB | 2382205 A | 7/2002 |
| JP | 2006347298 A | 12/2006 |
| WO | WO 2014091692 A1 | 4/1916 |
| WO | WO 2016059487 A1 | 4/2016 |

OTHER PUBLICATIONS

Search Report dated Mar. 22, 2018 for Great Britain Patent Application No. GB1715188.7 (6 Pages).

* cited by examiner

VEHICLE WHEEL ANTI-THEFT SYSTEM AND METHOD

TECHNICAL FIELD

This application generally relates to anti-theft systems for vehicle wheels and more specifically, to tracking a wheel removed from a vehicle.

BACKGROUND

Theft or unauthorized removal of wheels from a vehicle has become an increasingly common occurrence, especially in light of new wheel designs utilizing high-end, expensive materials. Existing solutions for preventing theft of vehicle wheels have several drawbacks. For example, one existing solution places specialized locking or anti-theft lug nuts on each wheel and requires a proper socket key to remove the lug nut. However, wheel thieves have discovered ways to circumvent or defeat such mechanical protections. Another existing anti-theft system places a tire pressure monitoring (TPM) sensor in each vehicle wheel and detects theft of a wheel when the sensor fails to communicate tire pressure information to the vehicle. In response to detecting theft, the vehicle telematics unit sends a notification regarding the theft to a call center, public authority, or vehicle owner. However, such solutions are not capable of tracking the stolen wheel once it is removed from the vehicle.

While there are other existing anti-theft systems that can track the location of a stolen wheel, for example, using GPS data transmitted by a tracking device installed inside the wheel, these systems further increase the manufacturing cost and complexity of each wheel and consume large amounts of power. For example, one such system requires installation and calibration of separate, dedicated anti-theft hardware in each wheel, including a proximity sensor for detecting the unauthorized removal of the wheel, a GPS receiver for tracking a geographical location of the wheel, and additional wireless communication circuitry for transmitting the wheel's location back to the vehicle owner or other entity.

Accordingly, there is still a need in the art for an improved vehicle wheel anti-theft system that is capable of effectively tracking a wheel removed from a vehicle but also, minimizes the cost, complexity, and power consumption of the vehicle wheels.

SUMMARY

The invention is intended to solve the above-noted and other problems by providing an improved vehicle wheel anti-theft system and method that, among other things, places a wireless transceiver in each vehicle wheel to convey tire pressure information for that wheel to the vehicle, and uses the same wireless transceiver to detect removal of the wheel from a vehicle and track the location of the removed wheel as it moves away from the vehicle.

For example, one embodiment provides a vehicle comprising a plurality of wheels, each wheel including a pressure sensor and a wireless transceiver; a central transceiver configured to obtain tire pressure and signal strength information from each of the wireless transceivers; and a processor communicatively coupled to the central transceiver and configured to detect removal of one of the wheels based on the signal strength information obtained from the wireless transceiver included in the removed wheel.

Another example embodiment provides a method comprising obtaining tire pressure and signal strength information from each of a plurality of wireless transceivers respectively coupled to a plurality of wheels included in a vehicle; and detecting, using one or more processors, removal of one of the wheels from the vehicle based on the signal strength information obtained from the wireless transceiver included in the removed wheel.

As will be appreciated, this disclosure is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

Figure 1:
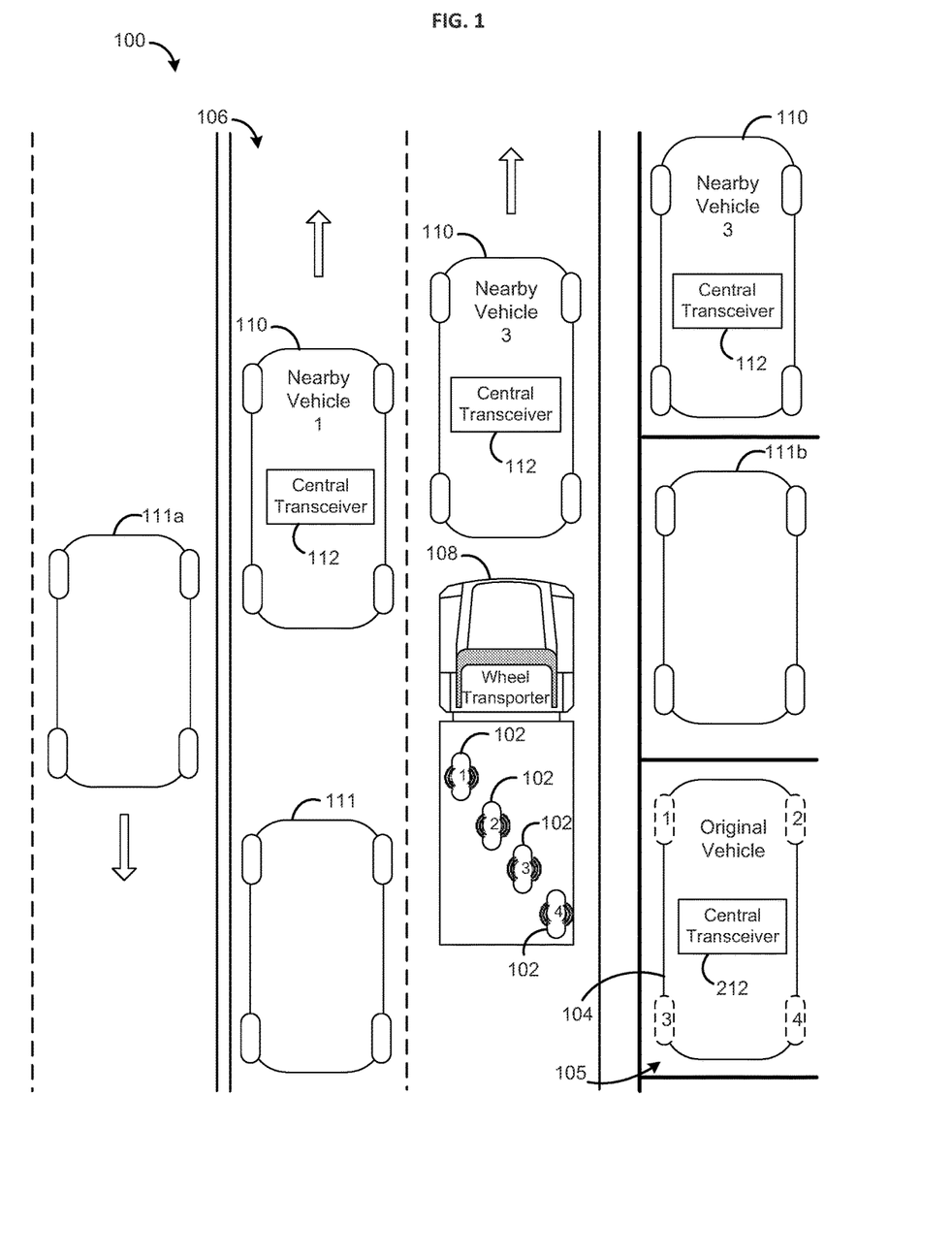
FIG. 1 is an illustration of an example environment for tracking a wheel removed from an original vehicle using wireless communications with nearby vehicles, in accordance with certain embodiments.

FIG. 1 illustrates an example environment 100 for tracking one or more wheels 102 that have been removed from a vehicle 104, in accordance with embodiments. As shown, the vehicle 104 is parked in a parking space 105 next to a road 106 and originally included four wheels 102. All four wheels 102 have been confiscated from the vehicle 104 (also referred to herein as the "original vehicle") and placed on a wheel transporter 108 that is traveling away from the vehicle 104 on the road 106.

As shown, the environment 100 can also include one or more nearby vehicles 110 that are within a predetermined distance of the wheels 102 and are configured to locate and track the wheels 102 removed from the original vehicle 104. For example, in embodiments, the original vehicle 104 and each of the one or more nearby vehicles 110 can include a vehicle system (such as, e.g., vehicle system 200 shown in FIG. 2) that is configured to facilitate tracking of the wheels 102 by interacting with each other, either directly (for example, using vehicle-to-vehicle communication) or indirectly (for example, via a remote server), and/or sharing information related to locating and tracking the stolen wheels 102. In some cases, the vehicle systems of the vehicles 104 and 110 may collectively form, or operate as, a distributed vehicle system (such as, e.g., wireless system 300 shown in FIG. 3) that links the individual vehicle systems through a wireless communication network, such as, for example, a cloud computing network controlled by, and/or associated with, a common vehicle manufacturer.

As also illustrated in FIG. 1, the environment 100 may further include one or more other vehicles 111 that are not capable of assisting with the tracking of the wheels 102. For example, these vehicles 111 may include a vehicle system that is not configured to facilitate tracking and locating of the wheels 102 upon removal from the vehicle 104. As another example, the vehicles 111 may include a vehicle system that is not compatible with the vehicle systems of the vehicles 104 and 110, or otherwise lacks the appropriate permissions to interact with such systems. In other embodiments, all vehicles on the road 106, or otherwise near the wheels 102, may include the appropriate vehicle system for assisting with the locating and tracking of the wheels 102.

Although the embodiments described herein are explained in the context of the original vehicle 104 and the wheels 102 removed therefrom, it should be appreciated that the same techniques may be applied upon detecting the removal of a wheel from any one of the nearby vehicles 110. For example, in such cases, the original vehicle 104 may join the other nearby vehicles 110 in helping to locate the removed wheel. Moreover, while FIG. 1 shows only three nearby vehicles 110, it will be appreciated that there may be any other number of nearby vehicles 110 in the environment 100, in accordance with the techniques described herein. Also, while the illustrated embodiment depicts the wheel transporter 108 as a moving truck, it should be appreciated that the wheel transporter 105 can be any type of vehicle or container capable of holding the wheels 102, and in some cases, may be parked or otherwise situated in a stationary location. Further, while FIG. 1 shows all of the nearby vehicles 110 as traveling in the same direction as the wheel transporter 105 along the road 106 and/or away from the original vehicle 104, in other cases, the nearby vehicles 110 may be moving in an opposite direction on the road 106, for example, along with the vehicle 111a, or not moving at all, for example, like the vehicle 111b parked next to the road 106. The embodiments described herein are intended to cover these and other variations of the environment 100 shown in FIG. 1, as will be apparent to those skilled in the relevant art.

Figure 2:
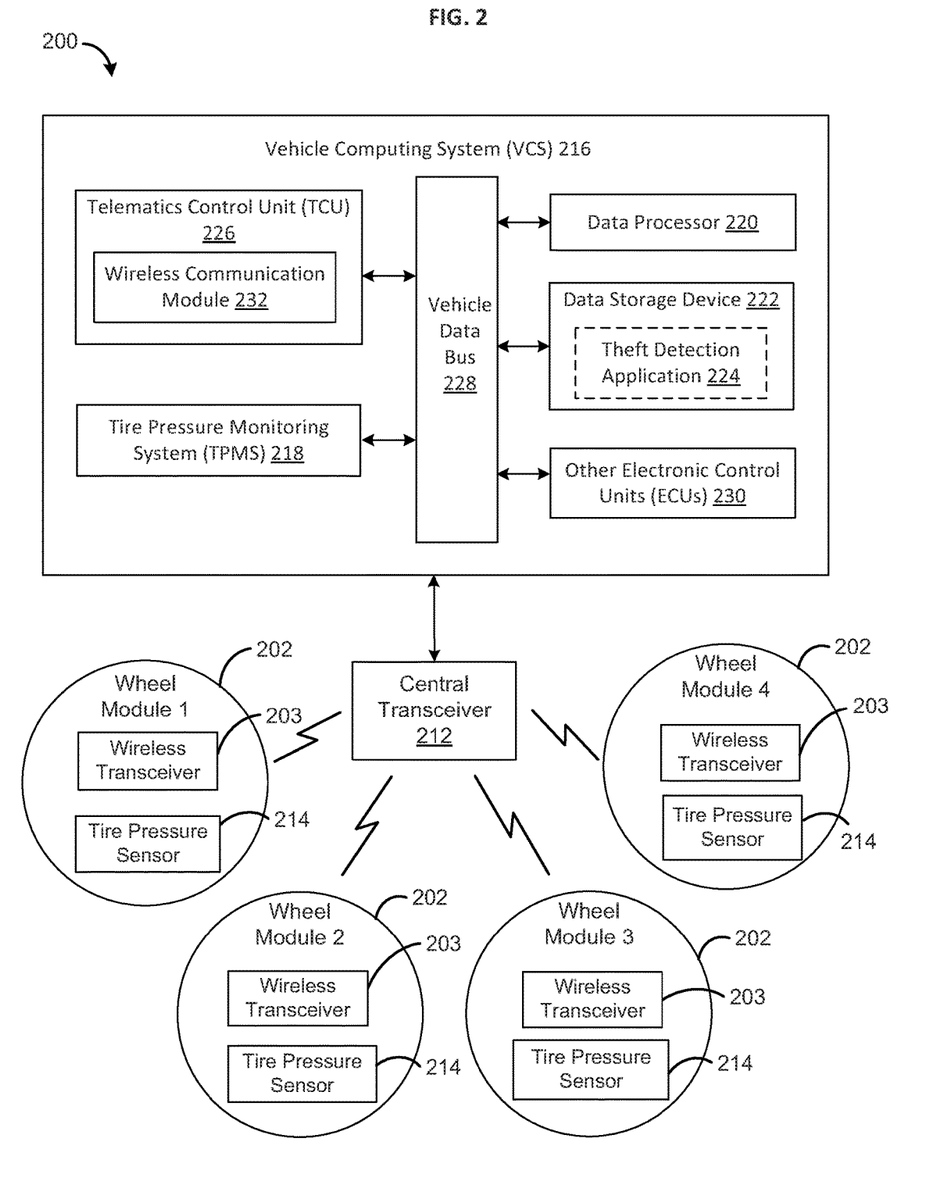
FIG. 2 is a block diagram of an example vehicle computing system included in one or more of the vehicles shown in FIG. 1, in accordance with certain embodiments.

Referring additionally to FIG. 2, shown is an exemplary vehicle system 200 included in the original vehicle 104 and configured to facilitate tracking of the one or more wheels 102 removed from the vehicle 104, in accordance with embodiments. The vehicle system 200 includes a plurality of wheel modules 202, and each wheel module 202 is included in a respective one of the wheels 102 of the original vehicle 104. As shown, each wheel module 202 includes a wireless transceiver 203 (also referred to herein as a "wheel transceiver") configured to send a wireless signal to a central wireless transceiver 212 (also referred to herein as a "central transceiver") of the vehicle system 200 and receive wireless signals therefrom. Each wheel module 202 also includes a tire pressure sensor 214 for measuring a tire pressure of the corresponding wheel 102. For example, the sensors 214 may be pressure sensors mounted in each wheel 102 of the vehicle 104, or any other type of sensor capable of measuring tire pressure. Each tire pressure sensor 214 can be configured to provide tire pressure measurements, a unique identification (ID) number associated with the wheel 102 and/or the sensor 214, and/or other related information (collectively referred to herein as "tire pressure information") to the wheel transceiver 203 included in the same wheel module 202. And each wheel transceiver 203 can be configured to wirelessly transmit, or otherwise provide, the tire pressure information to the central transceiver 212.

As shown in FIG. 2, the vehicle system 200 further includes a vehicle computing system (VCS) 216 communicatively coupled to the central transceiver 212 (e.g., via a wired or wireless connection). Upon receiving tire pressure information from the central transceiver 212, the VCS 216 provides the information to a tire pressure monitoring system (TPMS) 218 included in the VCS 216. Using the received information, the TPMS 218 monitors the tire pressure of each of the wheels 102 and alerts a driver when the tire pressure of any one of the wheels 102 falls below a certain level. The TPMS 218 can also identify, in the alert, which of the wheels 102 has low tire pressure based on the unique ID number included in the tire pressure information received from the central transceiver 212.

In addition to conveying tire pressure information to the central transceiver 212, each of the wheel transceivers 203 can also be configured to transmit signal strength information indicating a strength of the wireless signal being transmitted by the respective wheel transceiver 203. For example, the signal strength information provided by each wheel transceiver 203 may include a signal-to-noise ratio (SNR) measurement for that wheel transceiver 203. In embodiments, the signal strength information received from each wheel transceiver 203 can be used by the TPMS 218 and/or another component of the VCS 216 to determine whether the corresponding wheel 102 is still attached to the vehicle 104 or has been removed. For example, as long as the signal strength of each wheel transceiver 203 remains high, the vehicle system 200 can determine that the wheels 102 are in their appropriate places (i.e. attached to the vehicle 104). However, if the signal strength of a given wheel transceiver 203 starts to diminish with each new transmission, the vehicle system 200 may determine that the corresponding wheel 102 has been removed from the vehicle 104 and is moving away from the vehicle 104.

In embodiments, each wheel transceiver 230 may also transmit, with the signal strength information, identification information assigned to the wheel transceiver 203. The identification information may be used by the central transceiver 212, the TPMS 218, and/or another component of the VCS 216 to associate received signal strength information with an appropriate wheel transceiver 203 and/or wheel module 202. In some embodiments, the identification information may include a unique identifier and/or session key that authenticates the wheel transceiver 203 to the central transceiver 212. In some cases, the central transceiver 212 may include the corresponding unique identifier, or other session information, in wireless signals sent to a given wheel transceiver 203 in order to demonstrate that the transmission is valid or authorized.

In certain embodiments, each of the wheel transceivers 203 can be a long range, low power wireless transceiver capable of periodically transmitting low bit-rate wireless signals to, and/or receiving wireless signals from, the central transceiver 212. For example, in some cases, the wheel transceivers 203 may be configured to transmit a wireless signal comprising the tire pressure information, the signal strength information, and the identification information to the central transceiver 212 every few seconds, or other predetermined time period. In a preferred embodiment, the wheel transceivers 203 are battery-operated, Long-Range Wide Area Network (LoRaWAN) transceivers configured for bi-directional communication during scheduled time slots and operating within a designated low frequency band (such as, e.g., the 915 MHz band in North American applications) with a multi-year battery life (e.g., 7-9 years) and a wireless transmission range that spans several miles (e.g., a 5 to 7 mile radius). In some embodiments, the central transceiver 212 is also a LoRaWAN transceiver, and during normal operation, the wheel transceivers 203 and central transceiver 212 are configured to form a local LoRaWAN network within the vehicle 104. For example, the central transceiver 212 may operate as a gateway or base station of the local network, and the wheel transceivers 203 may operate as nodes or end-devices configured to periodically receive, or listen for, a beacon or other downlink transmission from the gateway and to transmit uplink messages during pre-assigned time slots or other periodic interval. In such cases, the VCS 216 of the vehicle system 200 may serve as a back-end infrastructure or network server that controls operation of the local LoRaWAN network and/or processes the data transmitted to the central transceiver 212 by the wheel transceiver 203.

In embodiments, each of the nearby vehicles 110 can include a vehicle system (such as, e.g., vehicle system 302 shown in FIG. 3) that is similar to the vehicle system 200 in order to facilitate tracking of its own wheels and/or wheels removed from another vehicle, such as the wheels 102 shown in FIG. 1. For example, as shown in FIG. 1, each of the nearby vehicles 110 can include a central transceiver 112 that is similar to the central wireless transceiver 212 shown in FIG. 2 and described herein. In some cases, the central transceivers 112 may be LoRaWAN transceivers, like the central transceiver 212. Moreover, the wheels in each of the nearby vehicles 110 can include wheel modules (not shown) that are similar to the wheel modules 202 shown in FIG. 2 and described herein.

In embodiments, the vehicle system 200 can be configured to detect an unauthorized removal or theft of a given wheel 102 based on the signal strength information received from the wheel modules 202 via the central transceiver 212 and in response to said detection, request the nearby vehicles 110 to track the stolen wheel 102 using their own central wireless transceivers 112. In such cases, the wheel transceivers 203 of the vehicle system 200 can be configured to communicate with not only the central transceiver 212 but also, other compatible wireless devices, such as, for example, the central transceivers 112 included in the nearby vehicles 110, in order to facilitate tracking of the stolen wheels 102. For example, once the vehicle system 200 detects removal of a given wheel 102 from the original vehicle 104, the transceivers 203, 212, and 112 may be configured to form a LoRaWAN network, where the wheel transceivers 203 operate as network nodes and the central transceiver 112 in each nearby vehicle 110 operates as a gateway device, like the central transceiver 212 of the original vehicle 104. Through this LoRaWAN network, the central transceivers 112 of the nearby vehicles 110 can search for and locate the wheel transceivers 203 included in the stolen wheels 102 and report information about the located transceivers 203 to the central transceiver 212 of the original vehicle 104.

As shown in FIG. 2, in certain embodiments, a data processor 220 included in the VCS 216 can be configured to execute software stored in a data storage device 222 of the VCS 216, such as, for example, a theft detection application 224, to implement the wheel tracking techniques described here. In some embodiments, the processor 220 and the data storage device 224 may form a portion of the TPMS 218. In other embodiments, the processor 220 and data storage device 224 may be included in another control module of the VCS 216. In either case, the theft detection application 224 may include computer software instructions that, when executed by the processor 220, cause the processor 220 to receive, from the central transceiver 212, the signal strength information transmitted by the wheel transceivers 203; detect removal of a given wheel 102 from the vehicle 104 based on a decrease in the signal strength information received from the corresponding wheel transceiver 203; in response, generate a removal notification comprising a request to track the wheel transceiver 203 of the removed wheel 102; and transmit the removal notification to the nearby vehicles 110, for example, using a telematics control unit (TCU) 226 of the VCS 216. In embodiments, the TCU 226 may be configured to communicate with the nearby vehicles 110 via a wireless communication network (such as, e.g., wireless communication network 304 shown in FIG. 3). Likewise, the nearby vehicles 110 may receive the removal notification through vehicle telematics units (not shown) included in their own vehicle systems.

In embodiments, the removal notification can include instructions to locate the wheel transceiver 203 included in the removed wheel 102 and to obtain current signal strength information therefrom. The removal notification can also include the identification information associated with the removed wheel transceiver 203, so that the central transceivers 112 can locate the appropriate wheel transceiver 203. For example, in response to receiving the removal notification, each of the nearby vehicles 110 may configure their central transceivers 112 to search or listen for a wireless device having the identification information included in the request. In the meantime, the removed wheel transceiver 203 may continue to periodically transmit a wireless signal comprising the tire pressure information, current signal strength information, and identification information associated therewith. As a result, each nearby vehicle 110 located within the wireless transmission range of the removed wheel transceiver 203 may receive the wireless signal transmitted by the removed wireless transceiver 203. Upon determining that the identification information included in the received wireless signal matches the identification information included in the request, the nearby vehicles 110 may send the current signal strength information included in the received wireless signal to the original vehicle 104, as requested by the removal notification.

In some embodiments, the data processor 220 and/or the theft detection application 224 can be further configured to determine an estimated location of the removed wheel 102 based on the current signal strength information obtained from the removed wheel transceiver 203 by the nearby vehicles 110. For example, upon executing the theft detection application 224, the data processor 220 may be configured to triangulate the location of the removed wheel transceiver 203 based on the current signal strength information obtained by at least three of the nearby vehicles 110, which can be used to calculate a distance between the removed wheel transceiver 203 and each of the three nearby vehicles 110, and further based on geographical location information for each of the three nearby vehicles 110 at the time of receiving the wireless signal from the removed wheel transceiver 103. In some cases, the geographical location information may be global positioning system (GPS) data or coordinates (e.g., longitude and latitude values) obtained by a GPS receiver (not shown) included in the vehicle system of the corresponding nearby vehicle 110.

In some embodiments, each of the nearby vehicles 110 may continue to track, or listen for transmissions from, the removed wheel transceiver 203 and provide the current signal strength information transmitted by the removed wheel transceiver 203 to the original vehicle 104 for as long as the nearby vehicle 110 remains within the wireless transmission range of the transceiver 203. However, once a given nearby vehicle 110 moves out of this wireless transmission range, the vehicle 110 may stop tracking the removed wheel transceiver 203 and may configure its central transceiver 112 to resume normal operation (e.g., monitoring tire pressure and signal strength information for each of its wheels).

In embodiments, the vehicle system 200 can be configured to notify, using the TCU 226, the vehicle owner, a public authority (e.g., the police), a service offered by the vehicle manufacturer, or another entity of the unauthorized removal of one or more wheels 102 from the vehicle 104 and/or of the estimated location of the removed wheels 102. If the estimated location changes, or as the vehicle system 200 receives new information from the nearby vehicles 110, the vehicle system 200 may send updated notifications to assist in the recovery of the removed wheels 102. In some cases, the vehicle system 200 may continue to track the removed wheels 102 via the nearby vehicles 110 until the removed wheels are 102 are recovered, the nearby vehicles 110 can no longer locate the removed wheels 102, and/or the vehicle system 200 receives a command to stop the tracking the wheels 102.

Figure 3:
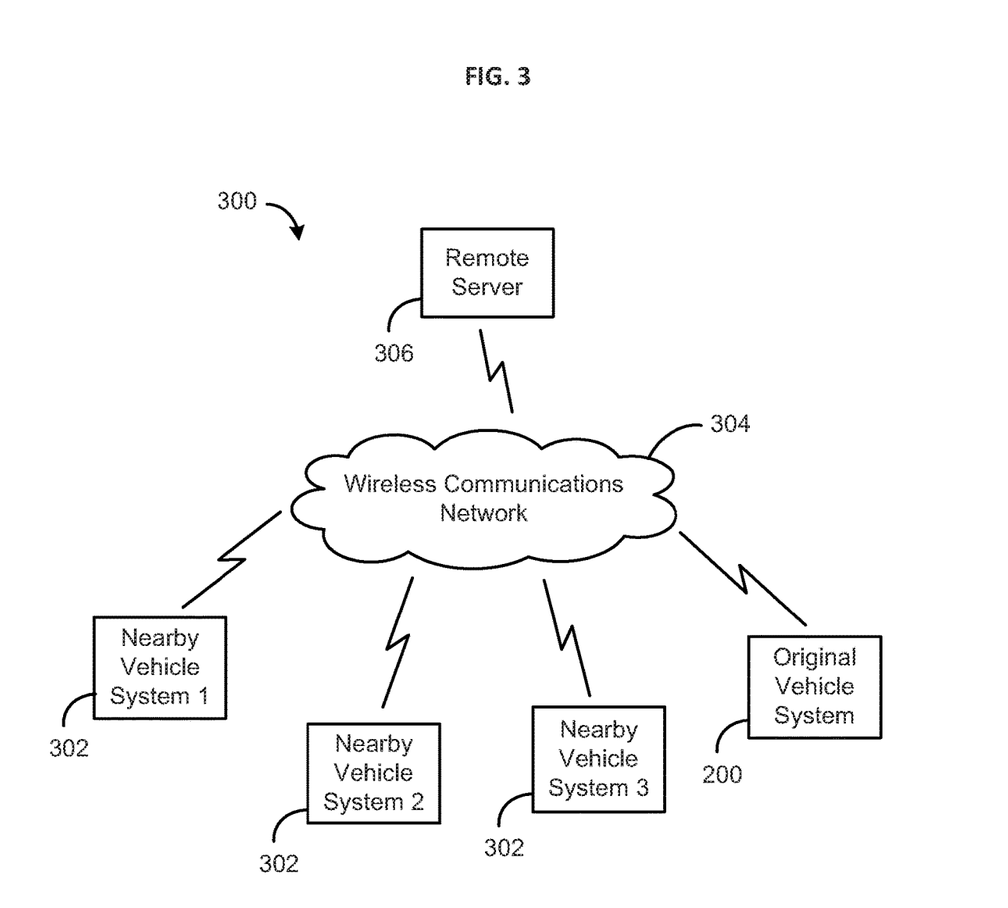
FIG. 3 is a block diagram of an example wireless system comprising the original vehicle and the nearby vehicles shown in FIG. 1, in accordance with certain embodiments.

Referring additionally to FIG. 3, shown is an example wireless system 300 comprising the vehicle system 200 included in the original vehicle 104 and a plurality of vehicle systems 302 that are respectively included in the nearby vehicles 110. Each of the vehicle systems 302 may be substantially similar to the vehicle system 200 shown in FIG. 2 and described herein. For example, each of the vehicle systems 302 includes the central transceiver 112 shown in FIG. 1 and wheel modules mounted inside the wheels of the corresponding nearby vehicle 110, each wheel module including a wheel transceiver configured to communicate tire pressure and signal strength information to the central transceiver 112. Each vehicle system 302 also includes a vehicle computing system (VCS) that is communicatively coupled to the central transceiver 112 and comprises at least a data processor for executing software, a data storage device for storing the software and other data, and a telematics control unit (TCU) for facilitating wireless communications.

As shown, the vehicle systems 200 and 302 are configured to wirelessly communicate with each other and/or a remote server 306 through a wireless communication network 304 (also referred to herein as the "wireless network"). In embodiments, the vehicle systems 200 and 302 may communicate with the wireless network 304 using the telematics control unit included in each of the systems 200 and 302. In some cases, the vehicle systems 200 and 302 can communicate with each other directly through the wireless network 304, for example, using LoRaWAN technology and/or dedicated short-range communications (DSRC) technology. In other cases, the vehicle systems 200 and 302 can communicate with each other through the remote server 306 included in the wireless system 300. For example, each of the vehicle systems 200 and 302 may be configured to send wireless transmissions to the remote server 306, using the TCU included therein, and the remote server 306 may be configured to forward the wireless transmission to the appropriate vehicle system 200, 302.

The wireless network 304 can include one or more different types of wireless communication networks, including, for example, internet access networks (such as, e.g., LoRaWAN, Wi-Fi, WLAN, WMAN, WWAN, etc.), wireless personal area networks (WPANs) (such as, e.g., Bluetooth, Zigbee, infrared, etc.), digital cellular networks (such as, e.g., LTE, LTE-Advanced, GSM, CDMA, GPRS, 3G, etc.), satellite networks (such as, e.g., global positioning system (GPS)), and short-range communication networks (such as, e.g., DSRC, radio frequency identification (RFID), near field communication (NFC), etc.). In some cases, two or more different types of wireless communication technology may be used to implement the wireless system 304. For example, a first communication network may be used for communication between the remote server 306 and each of the vehicle systems 200 and 302, and a second communication network may be used for communication between each of the vehicle systems 200 and 302.

In embodiments, the remote server 306 can be a cloud computing device, or can be included in a cloud computing network, both of which may be controlled by, and/or associated with, the vehicle manufacturer. In some embodiments, a secure, wireless communication channel may be pre-established between the VCS of each vehicle system 200, 302 and the remote server 306 in order to enable direct communication between the vehicle system 200, 302 and the server 306 without the need for pairing or authorization before each communication. The secure communication channel may be established by, or under the supervision of, the vehicle manufacturer. In some cases, the remote server 306 receives and stores GPS data for the vehicles 104, 110 from a GPS server and provides the GPS data to the vehicle systems 200, 302.

In some embodiments, the wireless system 300 operates as a distributed vehicle system that links together the vehicle systems 200 and 302, along with the remote server 306, via the wireless network 304 to facilitate tracking of wheels removed from any one of the vehicles 104 and 110. For example, the wireless network 304 may include a cloud computing network controlled by, and/or associated with, a common vehicle manufacturer of the vehicles 104 and 110. In such cases, the wireless system 300 may include all of the vehicle systems associated with the same vehicle manufacturer, and any vehicle system that is within the wireless transmission range of the wheel transceivers 203 removed from the vehicle 104 can be used to track of the transceivers 203. In certain embodiments, at least three vehicle systems are required to carry out techniques for triangulating a location of the wheels 102 removed from the vehicle 104. In such cases, the wireless system 300 may be configured to identify and select the vehicle systems of at least the three closest vehicles (e.g., the nearby vehicles 110 shown in FIG. 1) for the purposes of tracking the wheels 102. In some cases, the wireless system 300 may replace one of the vehicle systems 302 with another compatible vehicle system once the corresponding nearby vehicle 102 moves out of range of the wheel transceivers 203.

During normal operation of the wireless system 300, the central transceivers 112 and 212 included in the vehicle systems 302 and 200 focus their communications on the wheel transceivers included in their respective wheel modules, for example, to obtain tire pressure and signal strength information, as described above. As also described above, once a wheel theft is detected by, for example, the vehicle system 200, the vehicle system 200 may begin broadcasting a removal notification requesting the other vehicle systems 302 in the wireless system 300 to track the removed wheels. This broadcast may initiate a wheel tracking mode of the wireless system 300.

In embodiments, the vehicle system 200 may periodically broadcast the removal notification (for example, once every second or minute) so that each vehicle system 302 within the wireless system 300 has an opportunity to receive the broadcast. For example, at the time of the initial broadcast, one or more of the vehicle systems 302 may not be in a listening mode, or otherwise configured to receive transmissions, because the vehicle system(s) 302 were in a transmission mode themselves or otherwise occupied. Upon receiving the removal notification, the vehicle systems 302 may configure the central transceivers 112 included therein to search or listen for the wheel transceivers 203 of the removed wheels 102 using the identification information included in the removal notification. In some cases, the vehicle system 302 may need to wake up or turn on their central transceivers 112 in order to initiate the wheel tracking mode, for example, if the central transceivers 112 are not in a listening mode, or are otherwise not configured to receive transmissions In embodiments, the wheel transceivers 203 in the removed wheels 102 may be oblivious to their removal from the vehicle 104 and may continue to transmit or broadcast a wireless signal comprising current tire pressure and signal strength information, as well as the identification information associated with the corresponding transceiver 203. Accordingly, any central transceiver 112 within the wireless communication range of the removed wheel transceivers 203 can receive the wireless signals broadcast by the removed wheel transceivers 203. Upon locating the removed wheel transceivers 203, the central transceivers 112 can report the current signal strength information included in the wireless signal received from the transceivers 203 back to the vehicle system 200 and/or the remote server 306 via the wireless network 304. In some embodiments, the central transceivers 112 may be configured to continue their normal operations (e.g., monitoring tire pressure and signal strength information of their own wheels) while also operating in the wheel tracking mode.

In some embodiments, the remote server 306 can be configured to receive the current signal strength information from each of the vehicle systems 302 and calculate an estimated location of the removed wheels 102 based thereon. For example, in such cases, the remote server 306 may be configured to execute a software application for triangulating the location of the wheels 102 using the received signal strength information and geographical location information (e.g., GPS data) for each of the vehicle systems 302. The remote server 306 can be further configured to send the estimated location to the original vehicle 104 and/or a public authority or other entity involved in locating the removed wheels 102.

In embodiments, each of the vehicle systems 200 and 302 can include software for carrying out the wheel tracking mode of the wireless system 300. For example, as shown in FIG. 2, the vehicle system 200 includes a theft detection application 224, stored in the data storage device 222 of the VCS 216, for tracking of the wheels 102 upon removal from the vehicle 104. Each of the vehicle systems 302 may also include a similar theft detection application stored in the data storage device of the corresponding VCS. In some embodiments, a portion of the theft detection application 224 resides on the remote server 306 shown in FIG. 3, for example, to help estimate a current location of the removed wheels 102 based on the current signal strength information obtained from corresponding wheel transceivers 203. In other embodiments, the remote server 306 stores one or more software applications configured to enable the remote server 306 to interact with the theft detection applications 224 of the vehicle systems 200 and 302, supply information, such as GPS data and/or current signal strength information received from the other vehicle systems 302, to the vehicle system 200, and/or perform other operations related to implementing the wheel tracking mode of the wireless system 300.

Referring back to FIG. 2, the VCS 216 can be included in the vehicle system 200, for example, as part of a vehicle electronics system or an infotainment system of the vehicle 104, in accordance with embodiments. The VCS 216 may be an infotainment system such as the SYNC® system manufactured by FORD MOTOR COMPANY®. Other embodiments of the VCS 216 can include different, fewer, or additional components than those described below and shown in FIG. 2.

As shown in FIG. 2, the VCS 216 can include the data processor 220 (e.g., an electronic data processor), the data storage device 222, and a vehicle bus 228 (such as, e.g., a controller area network (CAN) bus). The VCS 216 can further include various electronic control units (ECUs) that are responsible for monitoring and controlling the electrical systems or subsystems of the vehicle 104, as described in more detail below. Each ECU may include, for example, one or more inputs and outputs for gathering, receiving, and/or transmitting data, a memory for storing the data, and a processor for processing the data and/or generating new information based thereon. In the illustrated embodiment, the ECUs of the VCS 216 include the TPMS 218, the TCU 226, and a plurality of other ECUs 230, including, for example, a body control module (BCM) for controlling and monitoring various electronic accessories in a body of the vehicle 104, a powertrain control module (PCM) for controlling and monitoring the engine and transmission of the vehicle 104, a human-machine interface (HMI) for enabling user interaction with the vehicle 104 and for presenting vehicle information to the vehicle operator.

In embodiments, the ECUs of the VCS 216 are interconnected by a vehicle bus 228 for passing data to and from the various ECUs, as well as other vehicle and/or auxiliary components in communication with the VCS 216. Further, the data processor 220 can communicate with any one of the ECUs and the data storage device 222 via the data bus 228 in order to carry out one or more functions and/or to support interactions with the central transceiver 212, the remote server 306, and/or the vehicle systems 302, including those associated with method 400 shown in FIG. 4.

The tire pressure monitoring system (TPMS) 218 is an ECU for monitoring the tire pressure of each of the wheels 102 of the vehicle 102 and alerting the vehicle owner when the tire pressure of a given wheel 102 drops below a threshold level. In some embodiments, the TPMS 218 can also be configured for monitoring the signal strength information transmitted by the wheel transceivers 203 of the wheels 102, detecting removal of one of the wheels 102 from the vehicle 104 using the techniques described herein, and tracking the removed wheels 102 using the current signal strength information received from one or more nearby vehicles. In other embodiments, a separate control module of the VCS 216 can be configured for monitoring wheel removal and tracking a removed wheel using the techniques described herein.

The telematics control unit (TCU) 226 is an ECU for enabling the vehicle system 200 to connect to various wireless networks, including, for example, GPS, WiFi, cellular, Bluetooth, NFC, RFID, satellite, and/or infrared. In embodiments, the TCU 226 can be configured to connect the vehicle system 200 to the wireless communication network 306 shown in FIG. 3. As shown, the TCU 226 (also referred to as a "vehicle telematics unit") includes a wireless communication module 232 comprising one or more antennas, radios, modems, receivers, and/or transmitters (not shown) for connecting to the various wireless networks. For example, the wireless communication module 232 can include a mobile communication unit (not shown) for wirelessly communicating over a cellular network (e.g., GSM, GPRS, LTE, 3G, 4G, CDMA, etc.), an 802.11 network (e.g., WiFi), a WiMax network, and/or a satellite network. The TCU 232 can also be configured to control tracking of the vehicle 104 using latitude and longitude values obtained from a GPS satellite.

In embodiments, the TCU 226 receives external data via the wireless communication module 232, and provides the external data to an appropriate ECU of the VCS 216 and/or the data processor 220. The external data may include, for example, the current signal strength information obtained from the wheel transceivers 203 by the vehicle systems 302 or an estimated location of the removed wheels 102 calculated by the remote server 306. In some embodiments, the TCU 226 also receives internal data from other ECUs of the VCS 216 and/or the data processor 220 with instructions to transmit the internal data to the remote server 306 shown in FIG. 3, one or more of the vehicle systems 302, another component of the wireless system 300, or a public authority or other entity facilitating tracking of the removed wheels 102. The internal data may include, for example, an estimated location of the removed wheels 102 calculated by the data processor 220 or the removal notification generated by the data processor 220 to request the vehicle systems 302 to help track the removed wheels 102.

In some embodiments, the wireless communication module 232 can be capable of wirelessly communicating over two or more networks to ensure continuity of network access, for example, in case one of the networks fail or are out of range. Moreover, the external data may be received at different receivers of the wireless communication module 232 depending on the wireless communication technology being used to transmit the data. For example, in some cases, data transmitted by the other vehicle systems 302 directly to the vehicle system 200 may be received at a DSRC receiver (not shown) of the wireless communication module 232. As another example, data transmitted by the remote server 306 to the vehicle system 200 may be received at a cellular or WiFi receiver (not shown) of the wireless communication module 232. In addition, data may be exchanged between the TCU 232 and the central transceiver 212 using a short-range transceiver (not shown) included in the wireless communication module 232, or through a wired connection between the VCS 216 and the central transceiver 212.

The data processor 220 can comprise one or more of a microprocessor, a microcontroller, a programmable logic array, an application-specific integrated circuit, a logic device, or other electronic device for processing, inputting, outputting, manipulating, storing, or retrieving data. In embodiments, the data processor 220 can be configured to execute software stored in the data storage device 222 (e.g., electronic memory), such as, for example, the theft detection application 224, as shown in FIG. 2. In some embodiments, the VCS 216 can comprise a general purpose computer that is programmed with various programming instructions or modules stored in the data storage device 222 or elsewhere.

The data storage device 222 can comprise one or more of electronic memory, nonvolatile random access memory (e.g., RAM), flip-flops, a computer-writable or computer-readable storage medium, a magnetic or optical data storage device, a magnetic or optical disc drive, a hard disk drive, or other electronic device for storing, retrieving, reading, or writing data. The data storage device 222 can store one or more software program modules or software instructions for execution by the data processor 220. For example, as shown in FIG. 2, the data storage device 222 may store all or a portion of the theft detection application 224.

Figure 4:
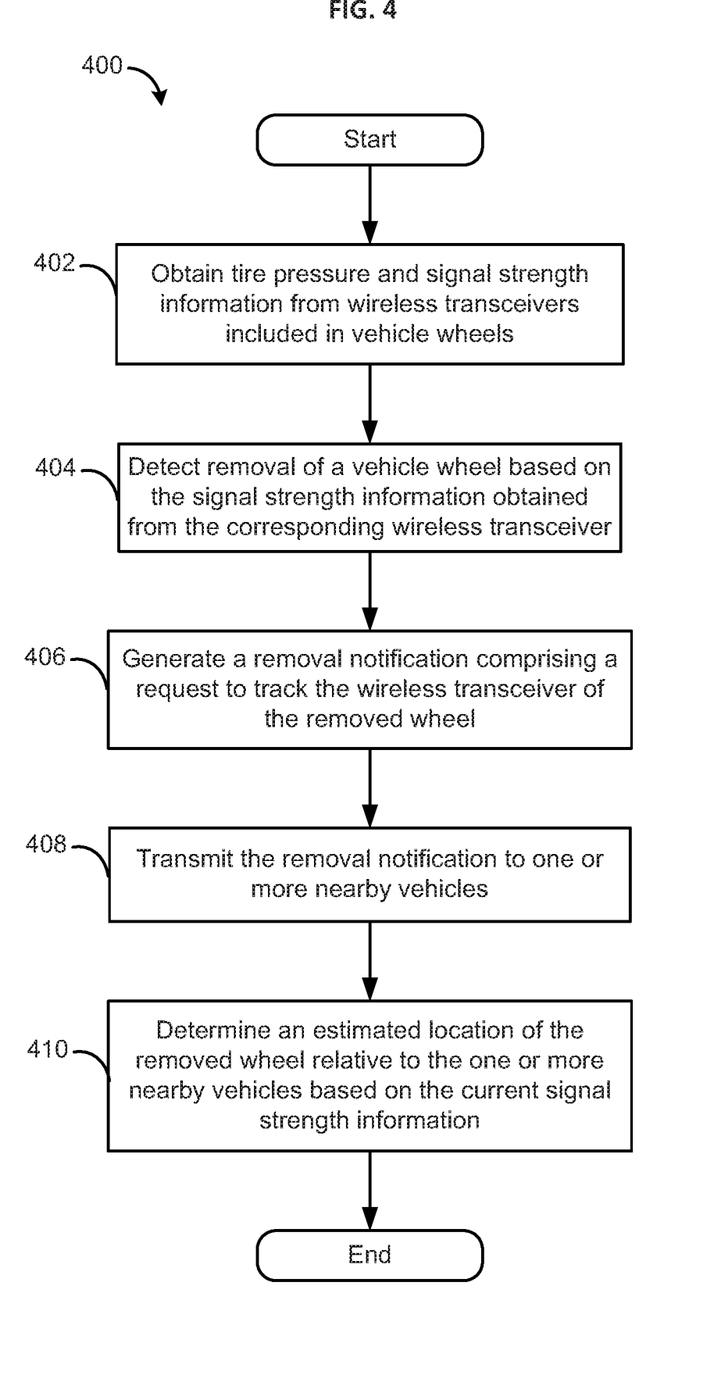
FIG. 4 is a flow diagram of an example method for tracking a wheel removed from a vehicle, in accordance with certain embodiments.

FIG. 4 illustrates an example method 400 for tracking a wheel removed from a vehicle without the vehicle owner's permission or authorization, in accordance with embodiments. As an example, the method 400 may be implemented, at least in part, by a processor (such as, e.g., the data processor 220) of a computing device executing a software application (such as, e.g., the theft detection application 224) stored in a memory (such as, e.g., the data storage device 224) of the computing device. In some embodiments, the method 400 can be carried out by a vehicle system of the vehicle, such as, for example, the vehicle system 200 or any of the other vehicle systems 302 included in the wireless system 300 shown in FIG. 3, or more specifically, by one or more computing devices included therein, such as, for example, one or more components of the vehicle computing device 216 shown in FIG. 2. Further, the vehicle system may interact with one or more components of the wireless system 300 to carry out the operations of the method 400, such as, for example, the remote server 306 and/or the other vehicle systems 302/200. In other embodiments, the method 400 may be carried out by more than one component of the wireless system 300, such as, for example, the vehicle system 200 and the remote server 306, or more specifically, by one or more computing devices included in each component.

As shown in FIG. 4, the method 400 begins at step 402, wherein one or more processors obtain tire pressure and signal strength information from each of a plurality of wireless transceivers (such as, e.g., the wheel transceivers 203 shown in FIG. 2) respectively coupled to a plurality of wheels (such as, e.g., the wheels 102 shown in FIG. 1) included in a vehicle (such as, e.g., the vehicle 104 shown in FIG. 1). In embodiments, a processor may obtain the tire pressure and signal strength information from a central transceiver (such as, e.g., the central transceiver 212 shown in FIG. 2) that is communicatively coupled to the plurality of wireless transceivers and to the vehicle computing system. For example, each wheel can include a tire pressure sensor (such as, e.g., the tire pressure sensors 214 shown in FIG. 2) that is communicatively coupled to the wireless transceiver also included therein. The tire pressure sensor can provide tire pressure information to the wireless transceiver for transmission to a tire pressure monitoring system (TPMS) (such as, e.g., the TPMS 218 shown in FIG. 2) included in the vehicle computing system. The wireless transceiver can measure or determine its own signal strength information and transmit a wireless signal comprising the tire pressure information and the signal strength information to the central transceiver. The processor may receive the wireless signal via a telematics control unit (TCU) (such as, e.g., the TCU 226 shown in FIG. 2) of the vehicle computing system or directly from the central transceiver, for example, via a wired connection. Upon receiving the wireless signal, the processor may provide the information included therein to one or more other components of the VCS, such as, for example, the tire pressure monitoring system. In some cases, the wireless signal received from each wireless transceiver also includes identification information (e.g., an identifier or session key) that is uniquely associated with the wireless transceiver.

As shown in FIG. 4, the method 400 further includes step 404, wherein one or more processors detect removal of one of the wheels from the vehicle based on the signal strength information obtained from the wireless transceiver included in the removed wheel. In embodiments, a processor detects removal of one of the wheels upon detecting a decrease in the signal strength of the wireless transceiver of the removed wheel, as compared to earlier signal strength measurement, or a baseline measurement established during normal operation. In some embodiments, detecting removal of a wheel further includes determining whether the decrease in signal strength indicates an increasing distance between the removed wheel and the vehicle. For example, the processor may periodically receive signal strength information from the corresponding wheel transceiver (e.g., once every one to five seconds) and translate each set of newly received signal strength information into a distance between the transceiver and the vehicle. If the distance calculated at a given time exceeds a threshold value (e.g., 1 meter), the processor may begin plotting the estimated distances over time, or otherwise analyze the periodically updated distance information, to determine whether the distance between the wheel transceiver and the vehicle is increasing, decreasing, or staying substantially the same. In some cases, the processor may use the periodically updated distance calculations, and/or corresponding geographical location information, to measure a rate of speed for the wheel transceiver. If the rate of speed is greater than a threshold value, the processor may determine that the wheel is moving away from the vehicle and thus, detect removal of the wheel from the vehicle.

At step 406, one or more processors generate a removal notification comprising a request to track the wireless transceiver of the removed wheel. In embodiments, the removal notification includes instructions to locate the wireless transceiver included in the removed wheel and obtain current signal strength information therefrom. In some embodiments, the removal notification further includes the identification information associated with each of the removed wheel transceivers. At step 408, one or more processors transmit or otherwise provide the removal notification to one or more nearby vehicles (such as, e.g., the nearby vehicles 110 shown in FIG. 1) located within a wireless transmission range of the wireless transceiver included in the removed wheel. For example, a processor may instruct a telematics control unit (TCU) (e.g., TCU 226 shown in FIG. 1) included in the vehicle computing system to broadcast the removal notification to all nearby vehicles directly, or to send the removal notification to the remote server for distribution to the nearby vehicles.

In embodiments, once a given nearby vehicle locates the wheel transceivers of the removed wheels, for example, using the identification information associated with the transceivers as a guide, the vehicle system of that nearby vehicle may begin listening to, or otherwise receive, a wireless signal transmitted by the removed wheel transceivers and comprising current signal strength information for the same. For example, the nearby vehicles may configure a central transceiver (e.g., the central transceivers 112 shown in FIG. 1) included in their own vehicle systems to receive the wireless signal transmitted by the wheel transceivers of the removed wheels (e.g., using the identification information included in the removal notification). The nearby vehicles may then transmit the received information back to the vehicle system that sent the removal notification and/or to the remote server included in the wireless system.

As shown in FIG. 4, the method 400 further includes step 410, wherein one or more processors determine an estimated location of the removed wheel relative to the one or more nearby vehicles based on the current signal strength information obtained by the one or more nearby vehicles. In embodiments, determining an estimated location of the removed wheel can include continuously or periodically receiving the current signal strength information obtained from the removed wheel transceivers by the one or more nearby vehicles. In some embodiments, a processor receives the current signal strength information for the removed transceivers from at least three of the one or more nearby vehicles, so that the processor has enough information to triangulate a location of the removed wheel. The processor may be included in the vehicle system of the vehicle, in which case the current signal strength information is received by the vehicle system, or in the remote server of the wireless system, in which case the current signal strength information is also received by the remote server.

According to embodiments, the step 410 can further include receiving geographical location information for each of the at least three nearby vehicles. For example, in some cases, the vehicle systems of the at least three nearby vehicles may provide current geographical location information for said vehicles to the processor, along with the current signal strength information obtained from the wheel transceivers of the removed wheels. In other cases, the remote server may provide current geographical location information for the nearby vehicles to the processor. In embodiments, the step 410 also includes triangulating a location of the removed wireless transceiver relative to the at least three nearby vehicles using the geographical locations of the at least three nearby vehicles and the current signal strength information obtained thereby. For example, based on the current signal strength information received from each of the nearby vehicles, the processor may calculate a distance between the removed wireless transceiver and the corresponding nearby vehicle. Using these distances and the current geographical location for each of the at least three nearby vehicles, the processor can triangulate an estimate location of the removed wheel transceivers using known techniques.

In some embodiments, the method 400 further includes upon receiving a removal notification requesting the vehicle to track a wireless transceiver included in a wheel removed from another vehicle, instructing a central transceiver included in the vehicle to locate a wireless signal transmitted by the removed wireless transceiver and to obtain signal strength information from the removed wireless transceiver. Thus, the vehicle system may, itself, perform the wheel tracking assistance that it requests from other, nearby vehicles in steps 406 and 408.

In certain embodiments, the process descriptions or blocks in the figures, such as FIG. 4, can represent modules, segments, or portions of code which include one or more executable instructions for implementing specific logical functions or steps in the process. Any alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

The invention claimed is:

1. A vehicle, comprising:
   wheels including wireless transceivers configured to periodically broadcast identification information associated therewith; and
   a processor communicatively coupled to the transceivers and configured to:
   detect removal of one of the wheels based on a transceiver signal strength information of the removed one of the wheel;
   broadcast the identification information of the one of the wheels to nearby vehicles; and
   locate the one of the wheels based on one or more of the nearby vehicles locating the one of wheels.

2. The vehicle of claim 1, wherein the wheels include pressure sensors, and
   wherein the wireless transceivers receive tire pressure information from the pressure sensors.

3. The vehicle of claim 2, wherein the wireless transceivers are configured to periodically communicate, to the processor(s), the tire pressure information, signal strength information, and the identification information associated with the wireless transceivers.

4. The vehicle of claim 1, further comprising a telematics unit communicatively coupled to the processor(s), wherein
   the processor(s) is further configured to generate a removal notification comprising a request to track one of the wireless transceivers corresponding to the one of the wheels; and
   the telematics unit is configured to transmit the removal notification to the nearby vehicles, the one or more of the nearby vehicles located within a wireless transmission range of the one of the wireless transceivers.

5. The vehicle of claim 4, wherein the removal notification includes instructions to locate the one of the wireless transceivers and obtain current signal strength information from said wireless transceiver.

6. The vehicle of claim 5, wherein the processor(s) is further configured to determine an estimated location of the one of the wheels based on the current signal strength information obtained by the one or more of the nearby vehicles.

7. The vehicle of claim 6, wherein the telematics unit transmits the removal notification to a remote server for distribution to the nearby vehicles and is further configured to receive, from the remote server, the current signal strength information obtained by the one or more of the nearby vehicles.

8. The vehicle of claim 6, wherein the telematics unit transmits the removal notification directly to the nearby vehicles and is further configured to receive, from the one or more of the nearby vehicles, the current signal strength information obtained from the one of the wireless transceiver.

9. The vehicle of claim 5, wherein the telematics unit transmits the removal notification to a remote server for distribution to the nearby vehicles and is further configured to receive, from the remote server, an estimated location of one of the wireless transceivers based on the current signal strength information obtained by the one or more of the nearby vehicles.

10. The vehicle of claim 1, wherein the wireless transceivers are Long Range Wide Area Network (LoRaWAN) transceivers.

11. The vehicle of claim 10, further comprising a central transceiver configured to facilitate communication between the processor(s) and the wireless transceivers, wherein the central transceiver is a LoRaWAN transceiver.

12. The vehicle of claim 10, wherein upon receiving a removal notification requesting the vehicle to track a first wireless transceiver removed from another vehicle, the processor(s) is further configured to instruct the central transceiver to locate a wireless signal transmitted by the first wireless transceiver and to obtain signal strength information from the first wireless transceiver.

13. A method, comprising:
    obtaining tire pressure strength information, and identification information from wireless transceivers coupled to wheels included in a vehicle;
    detecting, using a processor, removal of one of the wheels based on a transceiver signal strength information of the removed one of the wheel;
    broadcasting the identification information of the one of the wheels to nearby vehicles; and
    locating the removed wheel based on one or more of the nearby vehicles locating the one of the wheels.

14. The method of claim 13, wherein the comprises detecting a decrease in signal strength for one of the wireless transceivers corresponding to the one of the wheels.

15. The method of claim 13, further comprising:
    generating, using the processor(s), a removal notification comprising a request to track the one of the wireless transceivers corresponding to the one of the wheels; and
    transmitting the removal notification to the nearby vehicles, the one or more of the nearby vehicles located within a wireless transmission range of the one of the wireless transceivers.

16. The method of claim 15, wherein the removal notification includes instructions to locate the one of the wireless transceivers and obtain current signal strength information therefrom.

17. The method of claim 16, further comprising determining, using the processor(s), an estimated location of the one of the wheels relative to the one or more of the nearby vehicles based on the current signal strength information obtained by the one or more of the nearby vehicles.

18. The method of claim 17, wherein determining the estimated location comprises:

receiving the current signal strength information for the one of the wireless transceivers from at least three of the nearby vehicles;

receiving geographical location information for each of the at least three of the nearby vehicles; and triangulating a location of the one of the wireless transceivers relative to the at least three of the nearby vehicles using the geographical locations of the at least three of the nearby vehicles and the current signal strength information obtained thereby.

19. The method of claim 18, wherein determining the estimated location further comprises calculating a distance between the one of the wireless transceivers and each of the at least three of the nearby vehicles based on the current signal strength information obtained by the corresponding nearby vehicle.

20. The method of claim 13, further comprising, upon receiving a removal notification requesting the vehicle to track a first wireless transceiver included in a wheel removed from another vehicle, instructing a central transceiver included in the vehicle to locate a wireless signal transmitted by the first wireless transceiver and to obtain signal strength information from the first wireless transceiver.

* * * * *